United States Patent
Nakaota

(10) Patent No.: US 7,149,007 B2
(45) Date of Patent: Dec. 12, 2006

(54) IMAGE FORMING APPARATUS AND IMAGE FORMING METHOD

(75) Inventor: Hiroyuki Nakaota, Sunto-gun (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 874 days.

(21) Appl. No.: 10/254,877

(22) Filed: Sep. 26, 2002

(65) Prior Publication Data

US 2004/0061907 A1   Apr. 1, 2004

(51) Int. Cl.
*H04N 1/04* (2006.01)

(52) U.S. Cl. ............ 358/474; 358/1.15; 358/442; 358/440; 382/165; 382/284; 382/175

(58) Field of Classification Search ............ 358/474, 358/1.15, 442, 440, 1.13, 1.9, 504; 382/165, 382/284, 282, 164, 275
See application file for complete search history.

(56) References Cited

U.S. PATENT DOCUMENTS

| | | | |
|---|---|---|---|
| 6,647,153 B1* | 11/2003 | Ito | 382/284 |
| 6,674,466 B1* | 1/2004 | Takaoka | 348/224.1 |
| 6,674,537 B1* | 1/2004 | Kadowaki | 358/1.15 |
| 6,687,829 B1* | 2/2004 | Miyamoto et al. | 726/7 |
| 6,888,646 B1* | 5/2005 | Sawada et al. | 358/1.9 |
| 2002/0122203 A1* | 9/2002 | Matsuda | 358/1.15 |
| 2003/0068084 A1* | 4/2003 | Kinjo et al. | 382/164 |

FOREIGN PATENT DOCUMENTS

JP   2000-270148 A   9/2000

* cited by examiner

*Primary Examiner*—Douglas Q. Tran
*Assistant Examiner*—Negussie Worku
(74) *Attorney, Agent, or Firm*—Foley & Lardner LLP

(57) ABSTRACT

In the case of private scan, an entire control section saves, on a hard disk device, "setting information/data" for scan as a record, and reads, when necessary, "setting information/data" saved as a record on the hard disk device, thereby registering it as a template.

18 Claims, 9 Drawing Sheets

IMAGE FORMING APPARATUS AND IMAGE FORMING METHOD

BACKGROUND OF THE INVENTION

The present invention relates to an image forming apparatus and method for reading an image of a document with a scanner and forming an image.

In conventional image forming apparatuses such as digital copy machines, when setting, for example, the reading resolution of a scanner, users do it through a control panel always before a reading operation is performed.

Further, if there are a lot of to-be-set items, users pre-register them, as a template, on the control panel or client PC (template registration), and read the registered template to execute setting before a reading operation.

However, to enable reading of setting contents as, for example, a template, it is necessary to pre-register the setting contents. If users do not know beforehand that the setting contents will be often used, it is convenient for them to register the setting contents as a template. However, if they do not know whether the setting contents will be used again, they do not have to register the setting contents as a template, but need to remember the contents, which may degrade the operability.

BRIEF SUMMARY OF THE INVENTION

It is an object of the invention to provide an image forming apparatus and method in which the operability including template registration is enhanced.

To attain the object, there is provided an image forming apparatus comprising: an image reading section which reads an image of a document; a setting section which sets setting information for enabling the image reading section to read the document; a first saving section which stores, as a record, the setting information set by the setting section, when the image reading section has read the image of the document on the basis of the setting information; a second saving section which stores the setting information set by the setting section and provided with an identification name, to enable the setting information to be reused; and a control section which reads the setting information stored as a record in the first saving section, attaches the identification name to the setting information, and stores the setting information with the identification name into the second saving section.

There is also provided a method of forming an image using an image reading section configured to read an image of a document, comprising: selecting one of general scan and user-limited scan when setting is performed for enabling the image reading section to read the document; designating a user name if the user-limited scan is selected, and designating a common user if the general scan is selected; setting information for enabling the image reading section to read the document if the user name is designated; storing, as a record, setting information set by the setting, when the image reading section has read the image of the document on the basis of the setting information, the setting information being stored in units of designated user names; attaching an identification name to the setting information, and registering the setting information with the identification name in units of designated user names, to enable the setting information to be reused; reading the setting information stored as a record under a designated user name; and attaching an identification name to the setting information read by the reading, and registering the setting information with the identification name in units of designated user names, to enable the setting information to be reused.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the invention will be described with reference to the accompanying drawings.

Figure 1:
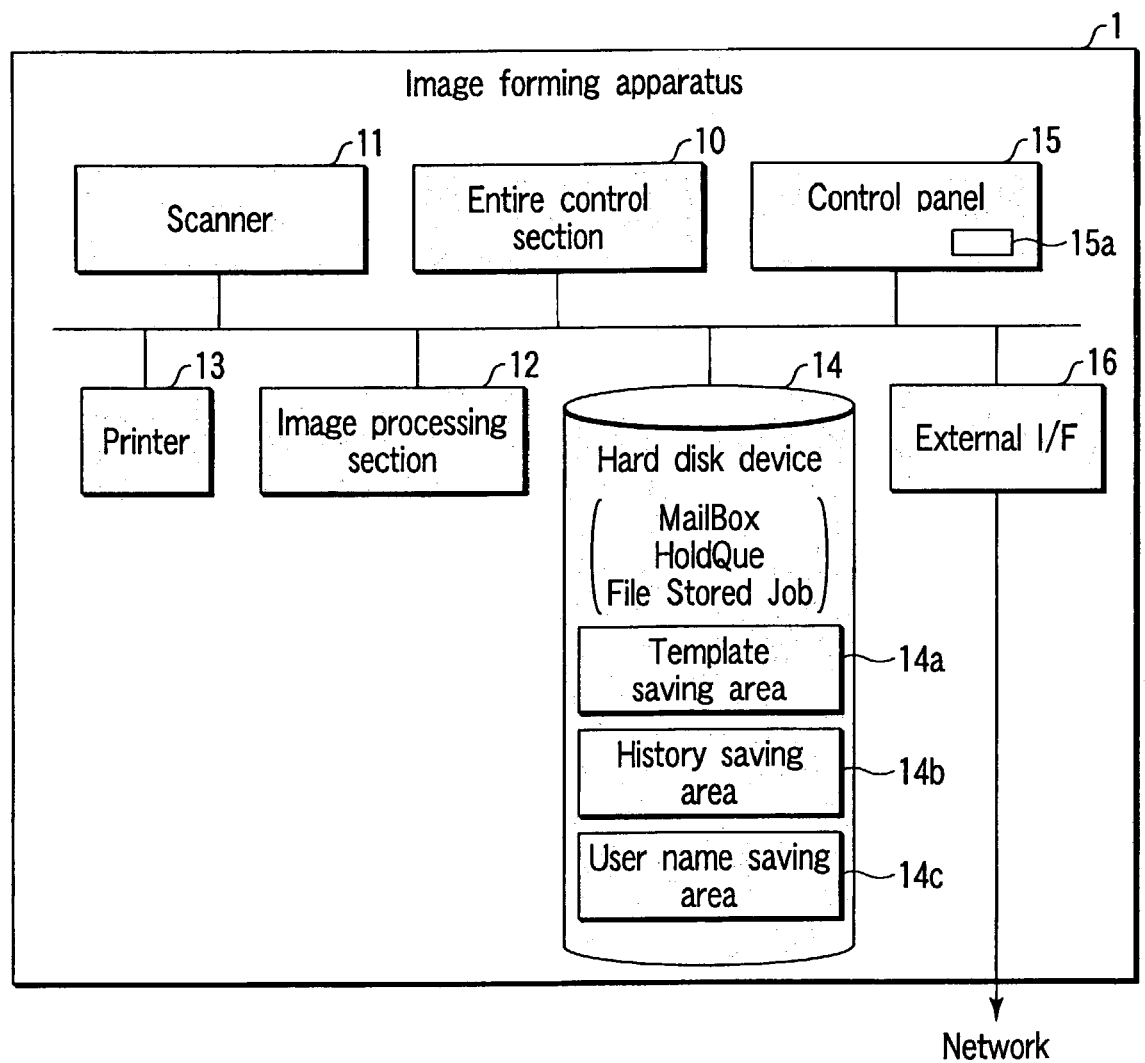
FIG. 1 is a block diagram roughly illustrating the configuration of an image forming apparatus of the invention.

FIG. 1 roughly illustrates the configuration of an image forming apparatus of the invention. Specifically, an image forming apparatus 1 comprises an entire control section 10, scanner 11, image processing section 12, printer 13, hard disk device 14, control panel 15 and external interface (I/F) 16.

The entire control section 10 controls the entire apparatus.

The scanner 11 scans a document by emitting light thereto from a light source (not shown), and reading light reflected therefrom using a CCD sensor (not shown).

The image processing section 12 executes processing such as γ correction, color conversion, main scanning magnification change, image separation, improvement, area processing, gradation correction, etc.

The printer 13 forms an image based on image data supplied from the image processing section 12.

The hard disk device 14, which will be described in detail later, has a template saving area 14a, history saving area 14b and user name saving area 14c, and is used to preserve (store), for example, setting information/data. "Setting information/data" of a common user (name), described later, is pre-recorded on the hard disk device 14.

The control panel 15 has a liquid crystal display 15a containing a touch panel, and is used to display various data items and input, for example, setting information/data.

Figure 2:
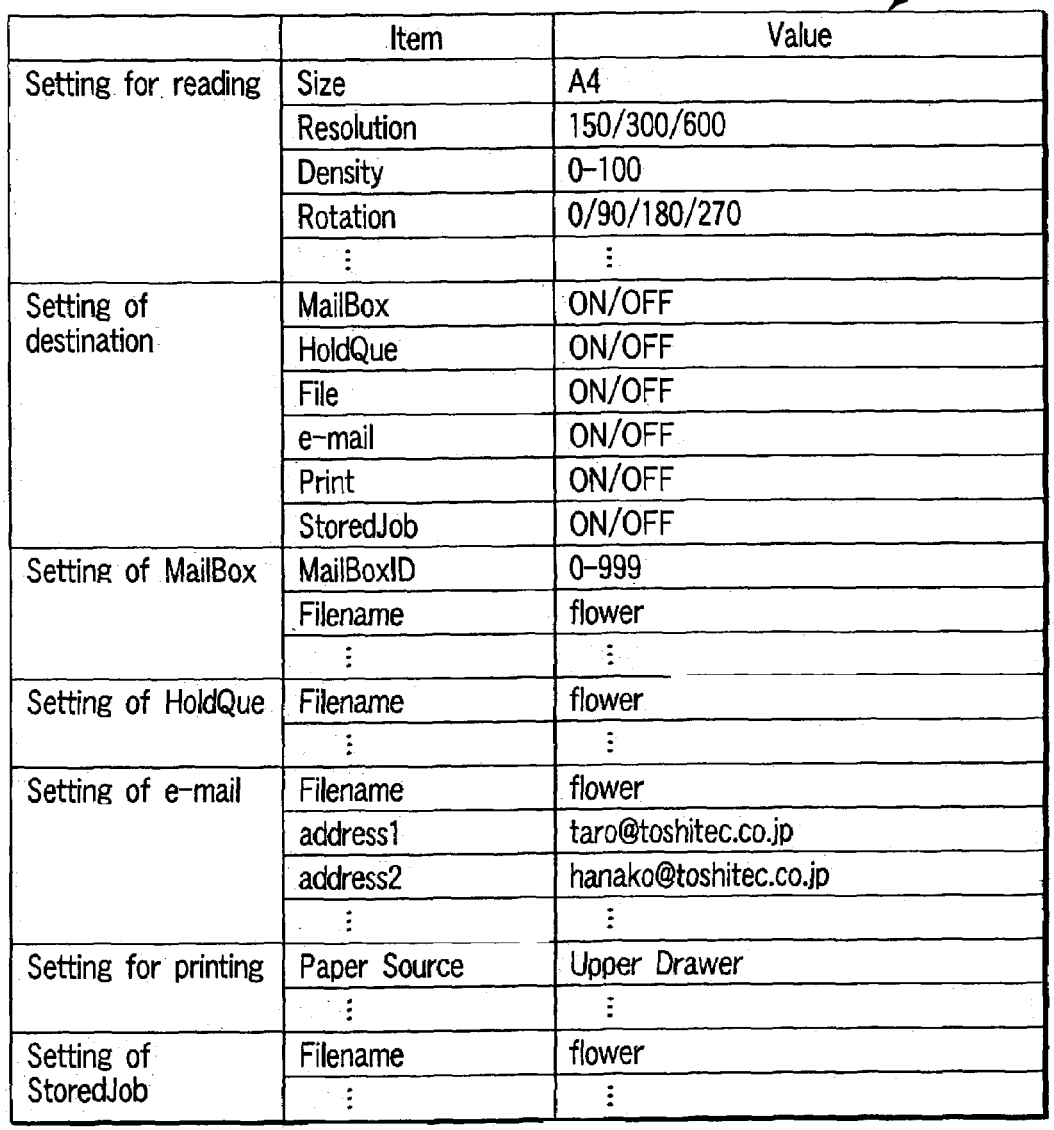
FIG. 2 is a view illustrating examples of stored setting information/data items for scan.

FIG. 2 shows setting information/data items for scan stored in the hard disk device 14.

As reading setting information, various items, such as "Size", "Resolution", "Density", "Rotation", etc., are provided, and respective values are set in these items. For example, "A4" indicative of A4-size paper sheets is set in the item "Size".

As transfer destination setting information, items "Mail Box", "Hold Que", "File", "e-mail", "Print", "Stored Job", etc. are provided, and "ON" or "OFF" is set in each item.

As "Mail Box" setting information, items "Mail Box ID", "Filename", etc. are provided, and "0–999", "flower", etc. are set as setting values in these items.

As "Hold Que" setting information, an item "Filename", for example, is provided, and "flower", a filename, is set as a setting value in the item.

A rough description will be given of the above configuration.

Firstly, in the invention, when the setting information/data for scan is input through the control panel 15, one of "General Scan" and "Private Scan" is selected.

"Private Scan" means that the setting information/data is used under the name of a user. On the other hand, "General Scan" means that the setting information/data is used under the name of a common user.

In the description, assume that "Private Scan" is selected. At first, the entire control section 10 causes the liquid crystal display 15a of the control panel 15 to display a screen for selecting one of "General Scan" and "Private Scan".

If "General Scan" is selected, the entire control section 10 determines that the common user is selected, and executes control for inputting, reading, etc. of the setting information/data for scan.

If "Private Scan" is selected, the entire control section 10 reads a user name list from the user name saving area 14c of the hard disk device 14, and displays it on the liquid crystal display 15a.

A user selects a user name from the user name list displayed on the liquid crystal display 15a, thereby executing an operation such as input, reading, etc. of the setting information/data for scan. A password may be set for each user name in light of security.

Figure 3:
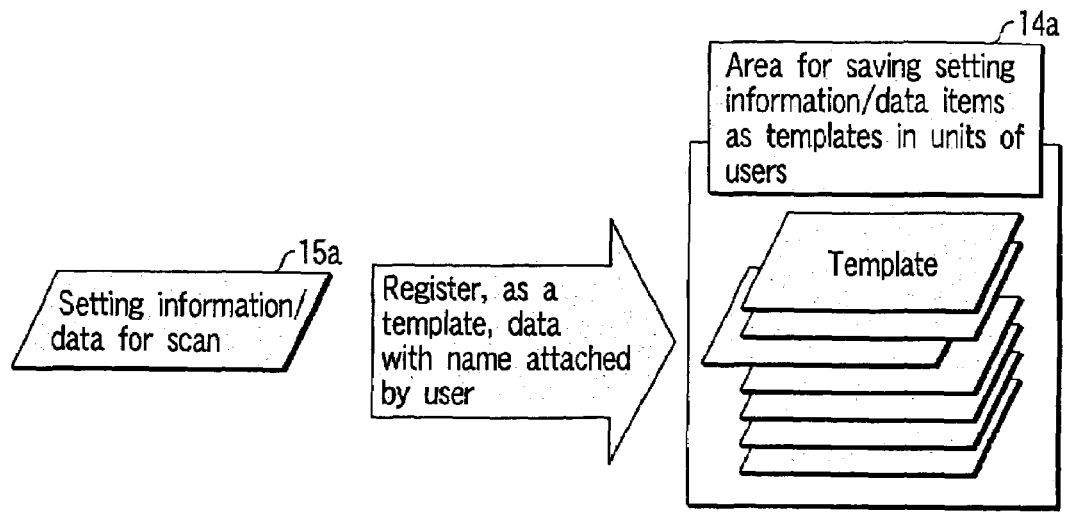
FIG. 3 is a view schematically illustrating the way of registering "setting information/data" for scan as a template.

FIG. 3 roughly shows the way of registering, as a template, "setting information/data" for scan with a name attached by a user.

The "setting information/data" for scan input through the control panel 15 is registered as a template with a name attached by a user. Specifically, in response to an instruction to execute template registration, the entire control section 10 saves "setting information/data items" with respective names as templates in units of users on the template saving area 14a of the hard disk device 14.

Figure 4:
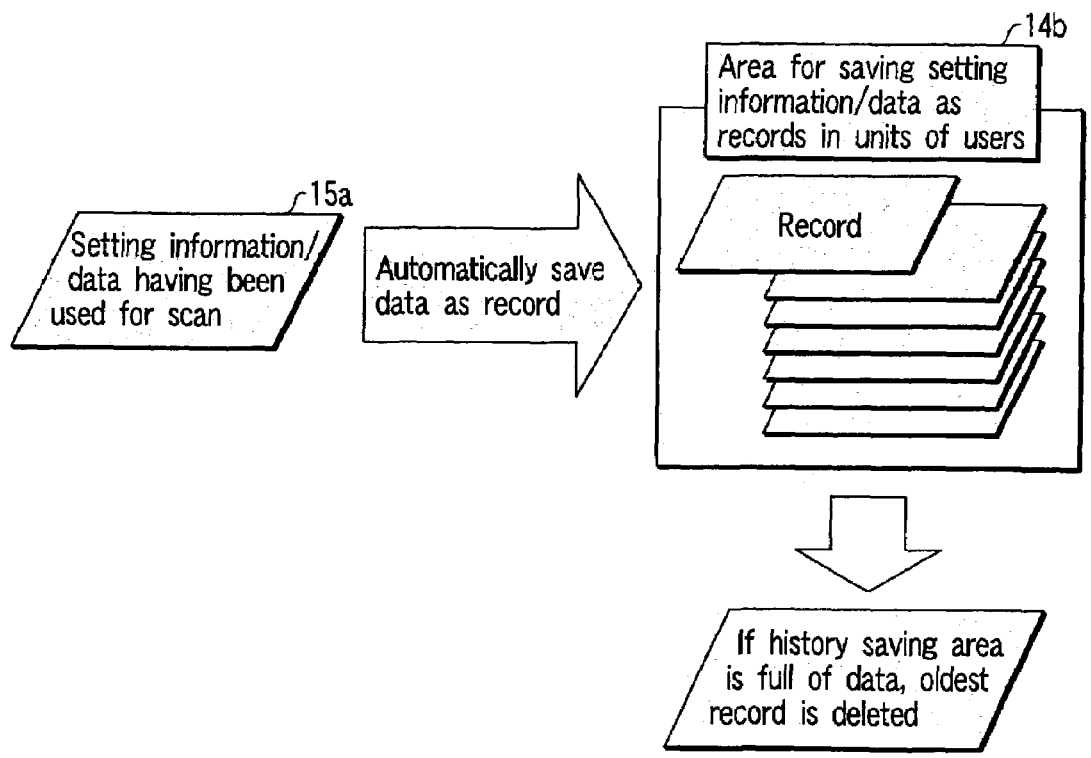
FIG. 4 is a view schematically illustrating the way of automatically saving, as records in units of users, "setting information/data items" that have been used for scan.

FIG. 4 roughly illustrates the way of automatically saving, as records in units of users, "setting information/data items" that have been used for scan.

The entire control section 10 saves, on the history saving area 14b as records in units of users, "setting information/data" input through the control panel 15 for the execution of scan. When the entire control section 10 saves "setting information/data" as a new record, it deletes the oldest record to save the new record if the history saving area 14b is full of data.

Figure 5:
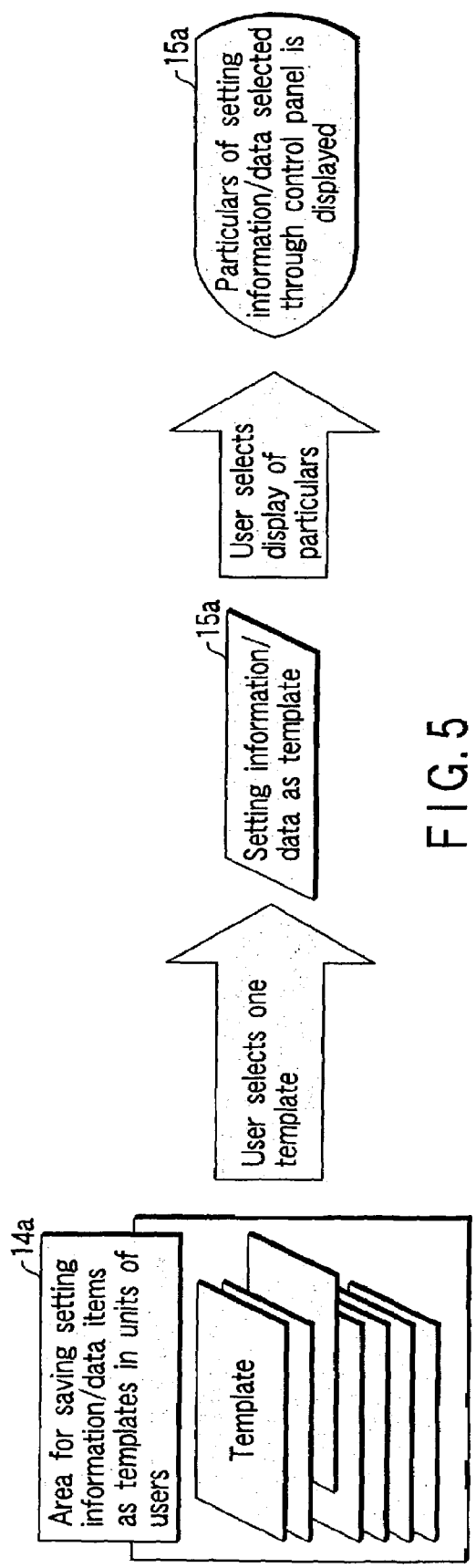
FIG. 5 is a view schematically illustrating the way of displaying "setting information/data items" registered as templates.

FIG. 5 roughly shows the way of displaying "setting information/data items" registered as templates.

A user roughly checks the templates with respective names displayed on the liquid crystal display 15a of the control panel 15, and selects a desired template.

Specifically, the entire control section 10 roughly displays, on the liquid crystal display 15a, the templates of the user saved on the template saving area 11a of the hard disk device 14.

If the user selects one of the templates, the entire control section 10 reads the "setting information/data" corresponding to the template from the template saving area 14a, and displays it on the liquid crystal display 15a. If the user selects "detailed display" on the liquid crystal display 15a, the entire control section 10 displays particulars of the setting information/data on the liquid crystal display 15a.

Figure 6:
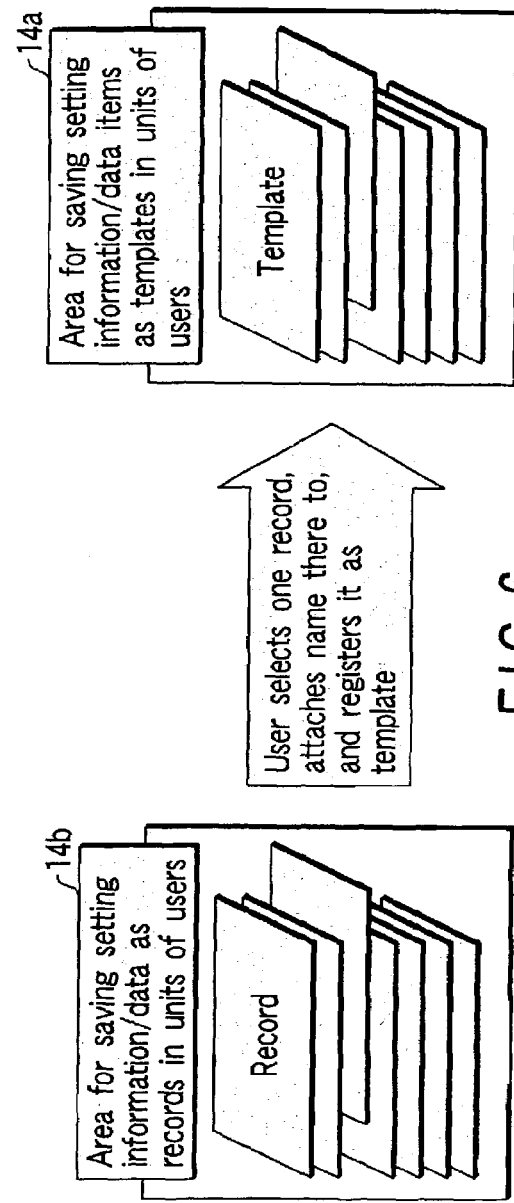
FIG. 6 is a view schematically illustrating the way of registering, as respective user's templates, "setting information/data items" registered as records.

FIG. 6 roughly illustrates the way of registering, as respective user's templates, "setting information/data items" registered as records.

When a user has instructed display of their history on the liquid crystal display 15a, the entire control section 10 displays, on the liquid crystal display 15a, the outline of the records, belonging to the user, saved on the history saving area 14b of the hard disk device 14. In this case, the date and time of saving of each record, held on the history saving area 14b, are also displayed.

The user selects one of the records displayed on the liquid crystal display 15a, and registers it as a template, attaching a name thereto. Specifically, the entire control section 10 registers, as a template, the "setting information/data" selected from the records by the user. At this time, the entire control section 10 saves the data in units of users on the template saving area 14a of the hard disk device 14.

Figure 7:
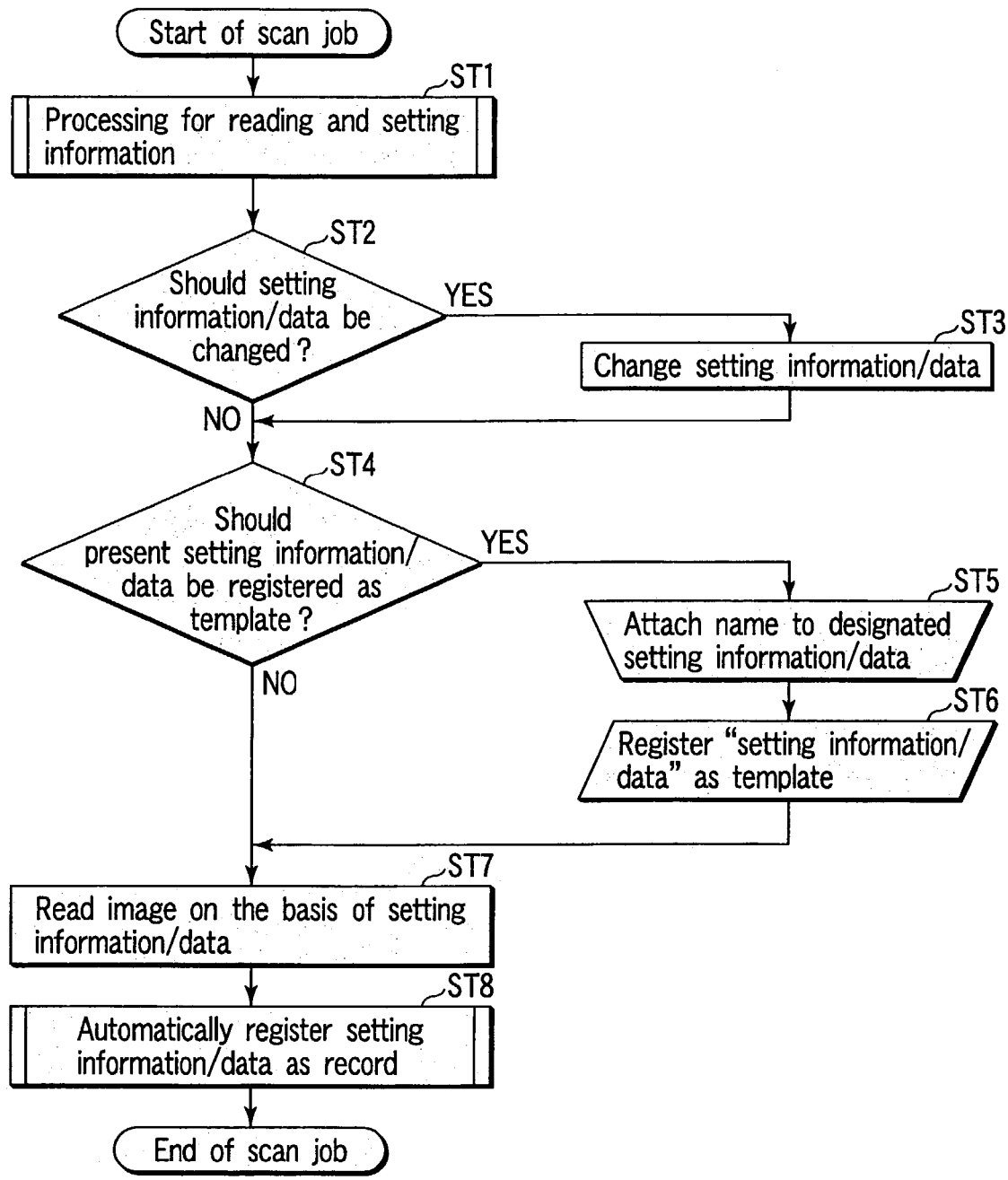
FIG. 7 is a flowchart useful in explaining the processing of "setting information/data" executed during a scan job.

Referring now to the flowchart of FIG. 7, a description will be given of the processing of "setting information/data", executed during a scanning job, according to the invention.

In the embodiment, the operation, performed after "Private Scan" and a user name are selected as aforementioned, will be described.

Firstly, the entire control section 10 reads and sets setting information/data (ST1). Subsequently, the entire control section 10 displays, on the liquid crystal display 15a, a message for confirming the user whether or not they would like to change the read setting information/data (ST2). If the data is not changed, the operation of the section 10 proceeds to a step ST4.

If there is an instruction to change the data, the entire control section 10 changes the setting information/data in accordance with a user's input through the control panel 15, thereby advancing its operation to the step ST4 (ST3).

At the step ST4, the entire control section 10 displays, on the liquid crystal display 15a, a message for confirming the user whether or not they would like to register the read setting information/data as a template (ST4). If template registration is not performed, the operation of the section 10 proceeds to a step ST7.

If template registration is instructed, the entire control section 10 permits the operation of the control panel 15 to input a name to be registered for the template (ST5). After that, the entire control section 10 saves (registers) the setting information/data with the name on the template saving area 14a, thereby advancing its operation to the step ST7 (ST6).

At the step ST7, the entire control section 10 reads an image of a document in accordance with the setting information/data, using the scanner 11 (ST7).

After completing the reading of the document, the entire control section 10 adds date/time information to the setting information/data to thereby save the resultant data as a record on the history saving area 14b (ST8), thereby finishing the scanning job.

Figure 8:
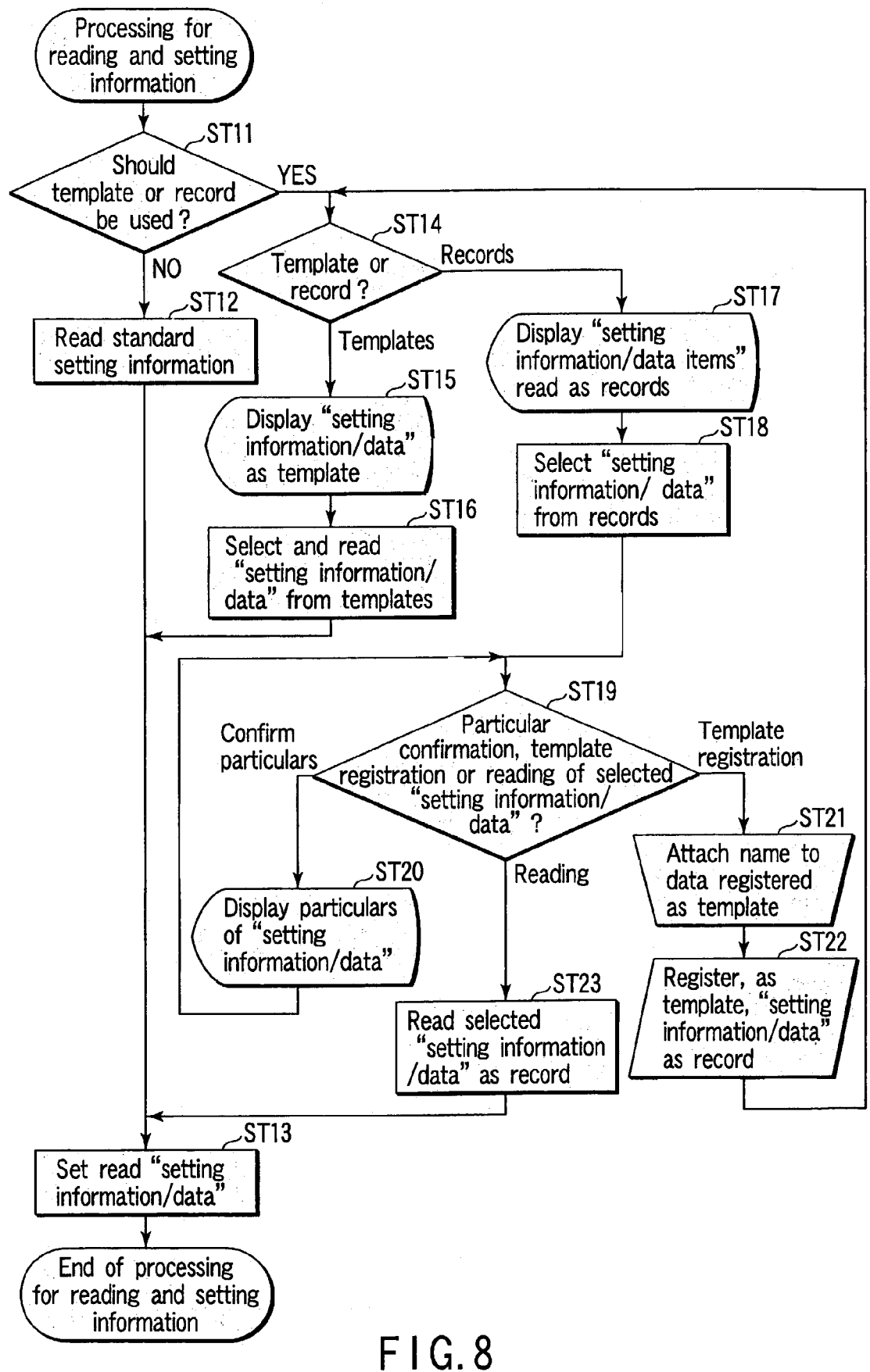
FIG. 8 is a flowchart useful in explaining the processing of reading and setting information.

Referring then to the flowchart of FIG. 8, a description will be given of the reading and setting of the setting information/data executed at the step ST1.

Firstly, the entire control section 10 displays, on the liquid crystal display 15a, a message for confirming the user whether or not they would like to use "setting information/data" as a template or record (ST11).

If there is an instruction not to use "setting information/data" as a template or record, the entire control section 10 reads standard "setting information/data" (ST12), and sets the read "setting information/data" (ST13).

If there is an instruction to use "setting information/data" as a template or record, the entire control section 10 displays, on the liquid crystal display 15a, a message for enabling the user to select the use of the template or record (ST14).

If the use of "setting information/data" as a template is selected, the entire control section 10 displays, on the liquid crystal display 15a, the outline of the "setting information/data", including template names, saved on the template saving area 14a (ST15). The outline of the "setting information/data" displayed at this time only indicates the data registered as templates with the already selected user name.

The entire control section 10 reads, from the template saving area 14a, the "setting information/data" selected from the displayed templates (ST16), and sets the read "setting information/data" (ST13).

Further, if the use of "setting information/data" as a record is selected at the step ST14, the entire control section 10 displays, on the liquid crystal display 15a, the outline of the "setting information/data", including date/time information, saved on the history saving area 14b (ST17). The outline of the "setting information/data" displayed at this time only indicates the data registered as records with the already selected user name.

The user selects "setting information/data" as a record by operating the liquid crystal display 15a (ST18).

The entire control section 10 displays, on the liquid crystal display 15a, a message for enabling the user to select confirmation of particulars of the selected "setting information/data" as a record, or template registration or reading of the same (ST19).

If the confirmation of particulars is selected, the entire control section 10 reads the "setting information/data" as a record from the history saving area 14b, and displays it on the liquid crystal display 15a, thereby returning its operation to the step ST19 (ST20).

If the template registration is selected, the entire control section 10 permits the user to operate the control panel 15 in order to input a name to be registered for the template (ST21). After that, the entire control section 10 saves (registers) the setting information/data with the name on the template saving area 14a, thereby shifting its operation to the step ST14 (ST22).

If the reading is selected, the entire control section 10 reads the "setting information/data" as a record from the history saving area 14b (ST23), and sets the read "setting information/data" (ST13).

Figure 9:
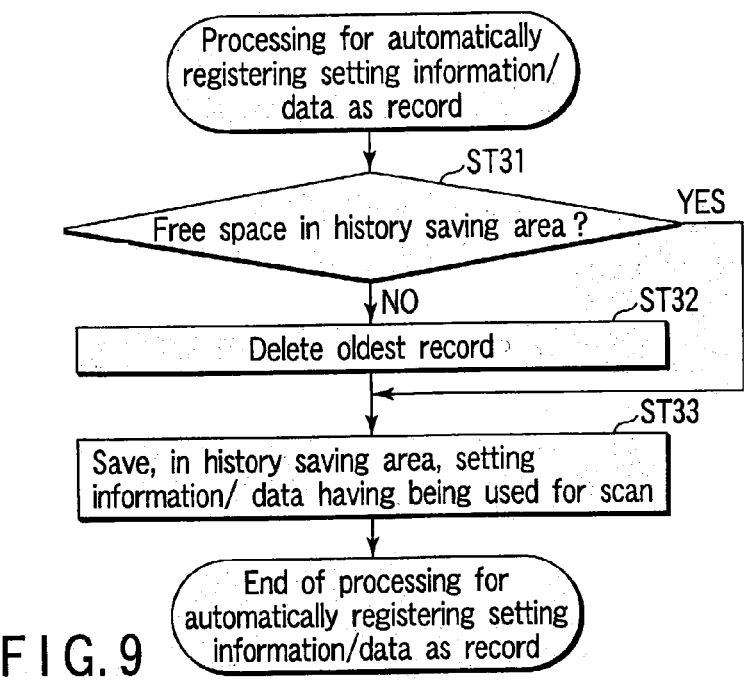
FIG. 9 is a flowchart useful in explaining the processing of automatically registering setting information/data as a record.

Referring to the flowchart of FIG. 9, automatic registration of "setting information/data" as a record, executed at the step ST8, will be described.

Firstly, the entire control section 10 confirms whether or not the history saving area 14b of the hard disk device 14 has free space for saving (ST31).

If it is determined at the step ST1 that there is no free space, the entire control section 10 deletes the oldest record saved on the history saving area 14b (ST32).

After that, the entire control section 10 saves the setting information/data for scan on the history saving area 14b, attaching date/time information thereto (ST33).

Figure 10:
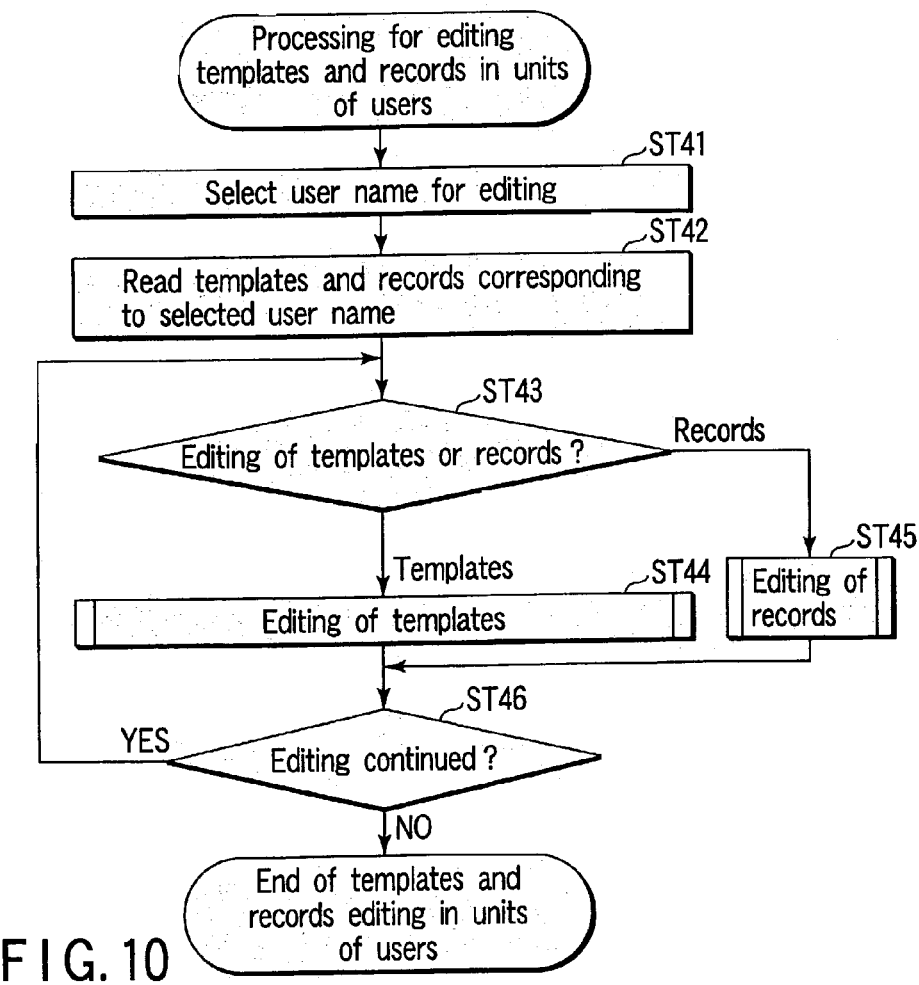
FIG. 10 is a flowchart useful in explaining the processing of editing templates and records in units of users.

Referring to the flowchart of FIG. 10, the editing of templates and records executed in units of users will be described.

At first, a user selects a user name, including a common user name, for executing editing using the control panel 15 (ST41).

When a user name for editing has been selected, the entire control section 10 reads, from the template saving area 14a, the outline of the templates with the selected user name, and reads, from the history saving area 14b, the outline of the records with the selected user name (ST42).

Subsequently, the entire control section 10 displays, on the liquid crystal display 15a, a message for enabling the user to select the editing of the read templates or records (ST43).

If the editing of templates is selected, the entire control section 10 executes editing of the templates (ST44). If the editing of the record is selected, the section 10 executes editing of the records (ST45).

After the editing of the templates or records, the entire control section 10 displays, on the liquid crystal display 15a, a message for confirming whether or not the user would like to continue editing (ST46), and finishes the editing process if editing is not to be continued.

Figure 11:
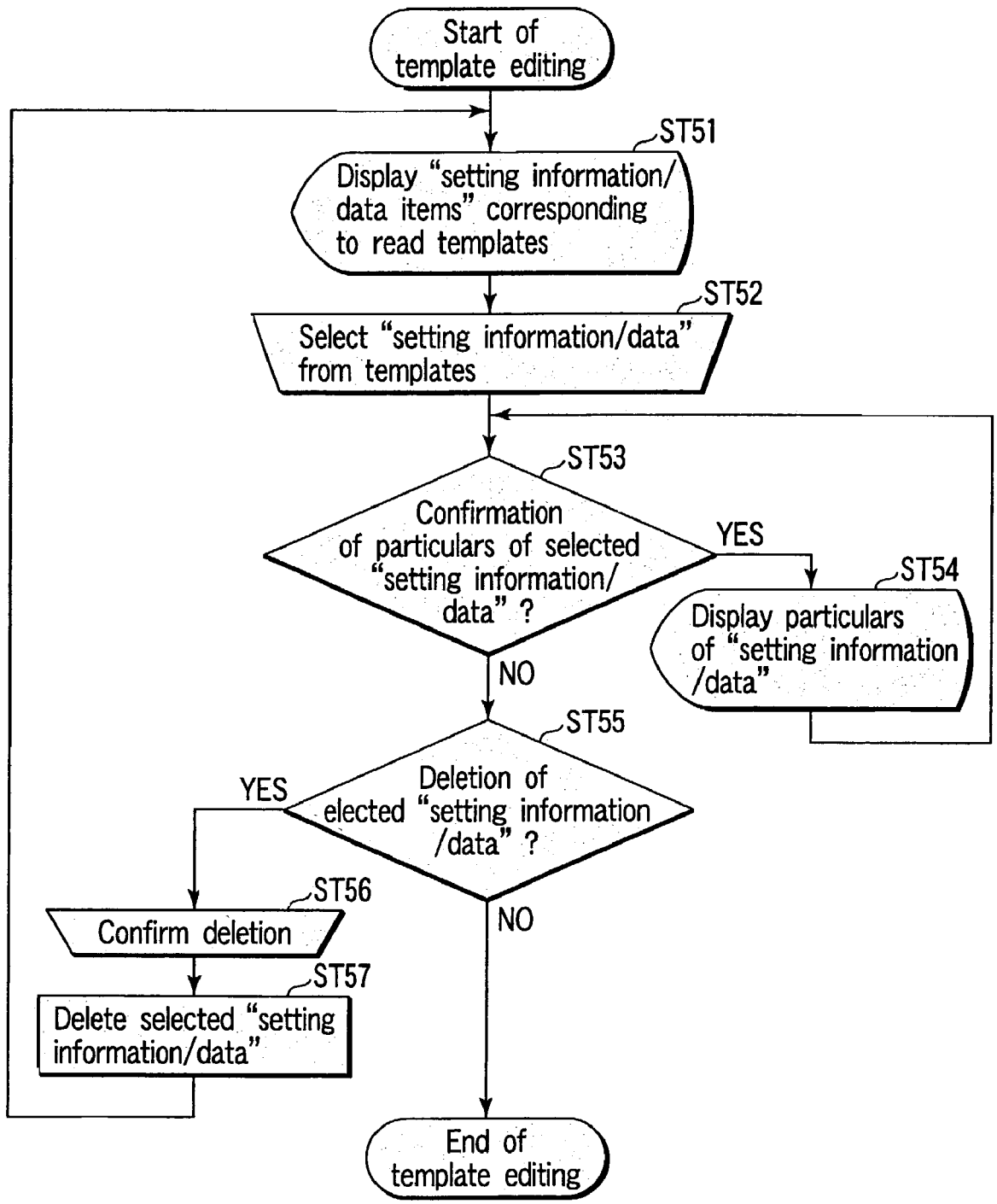
FIG. 11 is a flowchart useful in explaining the processing of editing templates.

Referring to the flowchart of FIG. 11, the template editing process at the step ST44 will be described.

At first, the entire control section 10 displays, on the liquid crystal display 15a, the read "setting information/data" including a name (ST51).

The user selects "setting information/data" from the templates displayed on the liquid crystal display 15a (ST52). At this time, if the user would like to confirm particulars of the selected "setting information/data", they input an instruction using the liquid crystal display 15a. If, on the other hand, they do not intend to confirm the particulars, the program proceeds to a step ST55 (ST53).

If the confirmation of particulars is selected, the entire control section 10 reads the selected "setting information/data" from the template saving area 14a, and displays the particulars on the liquid crystal display 15a, thereby returning its operation to the step ST53 (ST54).

At the step ST55, the entire control section 10 displays, on the liquid crystal display 15a, a message for confirming whether or not the user would like to erase the selected "setting information/data".

If "erasure" is instructed, the entire control section 10 displays, on the liquid crystal display 15a, a message "Should setting information/data be erased?" to confirm the execution of erasure (ST56).

After confirming the execution of erasure, the entire control section 10 erases the selected "setting information/ data" from the template saving area 14a (ST57), and returns its operation to the step ST51.

Further, if it is determined at the step ST55 that no data should be erased, the entire control section 10 finishes the template editing process.

Figure 12:
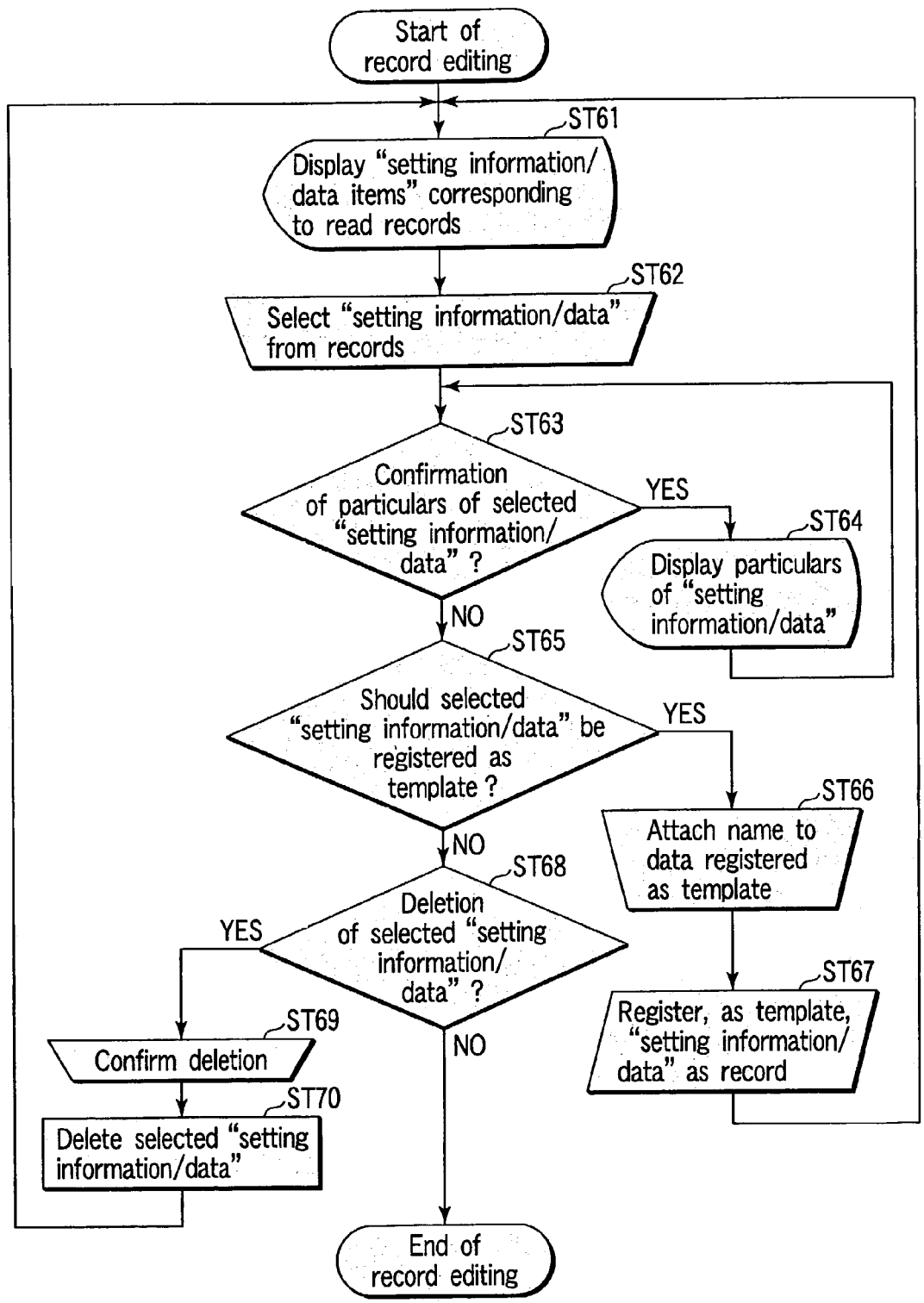
FIG. 12 is a flowchart useful in explaining the processing of editing records.

Referring to the flowchart of FIG. 12, the record editing process at the step ST45 will be described.

At first, the entire control section 10 displays, on the liquid crystal display 15a, the read "setting information/ data" including date/time of recording (ST61).

The user selects "setting information/data" from the outline of the records displayed on the liquid crystal display 15a (ST62). At this time, if the user would like to confirm particulars of the selected "setting information/data", they input an instruction using the liquid crystal display 15a. If, on the other hand, they do not intend to confirm the particulars, the program proceeds to a step ST65 (ST63).

If the confirmation of particulars is selected, the entire control section 10 reads the selected "setting information/ data" as a record from the history saving area 14b, and displays the particulars on the liquid crystal display 15a, thereby returning its operation to the step ST63 (ST64).

At the step ST65, the entire control section 10 displays, on the liquid crystal display 15a, a message for confirming whether or not the user would like to register the selected "setting information/data" as a template (ST65). If template registration is not performed, the program shifts to a step ST68.

If template registration is instructed, the entire control section 10 permits the operation of the control panel 15 by the user to input a name to be registered for the template (ST66). After that, the entire control section 10 saves (registers) the setting information/data with the name on the template saving area 14a, thereby returning its operation to the step ST61 (ST67).

At the step ST68, the entire control section 10 displays, on the liquid crystal display 15a, a message for confirming whether or not the user would like to erase the selected "setting information/data".

If "erasure" is instructed, the entire control section 10 displays, on the liquid crystal display 15a, a message "Should setting information/data be erased?" to confirm the execution of erasure (ST69).

After confirming the execution of erasure, the entire control section 10 erases the selected "setting information/ data" from the history saving area 14b (ST70), and returns its operation to the step ST61.

Further, if it is determined at the step ST68 that no data should be erased, the entire control section 10 finishes the record editing process.

As described above, in the embodiment of the invention, the setting information/data used for the past scan process can be read and registered as a new template, thereby facilitating user's operations.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An image forming apparatus comprising:
   an image reading section which reads an image of a document;
   a selecting section which selects one of general scan and user-limited scan when setting is performed for enabling the image reading section to read the document;
   a designating section which designates a user name if the selecting section selects the user-limited scan, and designates a common user if the selecting section selects the general scan;
   a setting section which sets information for enabling the image reading section to read the document;
   a first saving section which stores, as a record, setting information set by the setting section, when the image reading section has read the image of the document on the basis of the setting information, the setting information being stored in units of user names designated by the designating section;
   a second saving section which attaches an identification name to the setting information set by the setting section, and stores the setting information with the identification name in units of user names designated by the designating section, to enable the setting information to be reused;
   a first control section which reads the setting information stored as a record on the first saving section under a user name designated by the designating section; and
   a second control section which attaches an identification name to the setting information read by the first control section, and saves the setting information with the identification name on the second saving section in units of user names designated by the designating section, to enable the setting information to be reused.

2. The image fonning apparatus according to claim 1, wherein the first saving section is a predetermined area on a hard disk device.

3. The image forming apparatus according to claim 1, wherein the first saving section attaches date and time information to the setting information to be stored as a record.

4. The image forming apparatus according to claim 1, wherein if a predetermined area on the hard disk device is full of data, the first saving section deletes oldest data from the setting information to store new data to be added to the setting information as a new record.

5. The image forming apparatus according to claim 1, wherein the second saving section is a predetermined area on a hard disk device.

6. The image forming apparatus according to claim 1, wherein if the setting information with the identification name stored on the second saving section is reused, the first control section reads the setting information from the second saving section.

7. A method of forming an image using an image reading section configured to read an image of a document, comprising:
   selecting one of general scan and user-limited scan when setting is performed for enabling the image reading section to read the document;
   designating a user name if the user-limited scan is selected, and designating a common user if the general scan is selected;
   setting information for enabling the image reading section to read the document if the user name is designated;
   storing, as a record, setting information set by the setting, when the image reading section has read the image of the document on the basis of the setting information, the setting information being stored in units of designated user names;

attaching an identification name to the setting information, and registering the setting information with the identification name in units of designated user names, to enable the setting information to be reused;

reading the setting information stored as a record under a designated user name; and attaching an identification name to the setting information read by the reading, and registering the setting information with the identification name in units of designated user names, to enable the setting information to be reused.

8. The image forming method according to claim 7, wherein the step of storing, as a record, setting information set by the setting comprises saving the record onto a predetermined area on a hard disk device.

9. The image forming method according to claim 7, wherein the step of storing, as a record, setting information set by the setting comprises attaching date and time information to the setting information to be stored as a record.

10. The image forming method according to claim 7, wherein if a predetermined area on the hard disk device is full of data, the step of storing, as a record, setting information set by the setting comprises deleting oldest data from the setting information and adding new data to the setting information as a new record.

11. The image forming method according to claim 7, wherein the step of attaching an identification name to the setting information read by the reading comprises saving the identification name to the setting information onto a predetermined area on a hard disk device.

12. The image forming method according to claim 7, wherein if the setting information with the identification name is reused, the method comprises reading the setting information from a predetermined area on a hard disk device.

13. An image forming apparatus comprising:

image reading means which reads an image of a document;

selecting means which selects one of general scan and user-limited scan when setting is performed for enabling the image reading means to read the document;

designating means which designates a user name if the selecting means selects the user-limited scan, and designates a common user if the selecting means selects the general scan;

setting means which sets information for enabling the image reading means to read the document;

first saving means which stores, as a record, setting information set by the setting means, when the image reading means has read the image of the document on the basis of the setting information, the setting information being stored in units of user names designated by the designating means;

second saving means which attaches an identification name to the setting information set by the setting means, and stores the setting information with the identification name in units of user names designated by the designating means, to enable the setting information to be reused;

first control means which reads the setting information stored as a record on the first saving means under a user name designated by the designating means; and second control means which attaches an identification name to the setting information read by the first control means, and saves the setting information with the identification name on the second saving means in units of user names designated by the designating means, to enable the setting information to be reused.

14. The image forming apparatus according to claim 13, wherein the first saving means is a predetermined area on a hard disk device.

15. The image forming apparatus according to claim 13, wherein the first saving means attaches date and time information to the setting information to be stored as a record.

16. The image forming apparatus according to claim 13, wherein if a predetermined area on the hard disk device is full of data, the first saving means deletes oldest data from the setting information to store new data to be added to the setting information as a new record.

17. The image forming apparatus according to claim 13, wherein the second saving means is a predetermined area on a hard disk device.

18. The image forming apparatus according to claim 13, wherein if the setting information with the identification name stored on the second saving means is reused, the first control means reads the setting information from the second saving means.

* * * * *